United States Patent [19]

Larimore

[11] Patent Number: 5,305,649

[45] Date of Patent: Apr. 26, 1994

[54] CABLE LENGTH AND TENSION MEASURING DEVICE

[75] Inventor: David R. Larimore, Carrollton, Tex.

[73] Assignee: Halliburton Company, Houston, Tex.

[21] Appl. No.: 867,399

[22] Filed: Apr. 13, 1992

[51] Int. Cl.[5] .............................. G01L 1/00
[52] U.S. Cl. ...................... 73/862.391; 73/862.451
[58] Field of Search ............... 73/151.5, 158, 862.391, 73/862.44, 862.471, 862.473, 862.451, 862.454, 862.56; 254/403, 405, 406, 411, 389, 390, 391, 392

[56] References Cited

U.S. PATENT DOCUMENTS

| | | | |
|---|---|---|---|
| 1,901,962 | 3/1933 | Greene | 73/862.454 |
| 3,494,183 | 2/1970 | Sokolosky | 73/864.454 |
| 4,492,363 | 1/1985 | Niskin | 254/411 |

OTHER PUBLICATIONS

"Composite Catalog of Oil Field Equipment and Services," 37th Revision, vol. 2, by World Oil, Houston (p. 2584).
SIE Wireline Products, Ft. Worth, Tex. (p. 3.2).
Martin-Decker, 1988-1989 Catalog, Cedar Park, Tex. (p. 13).
Mathey Wireline Units, by Mathey International, Ltd., Tulsa, Okla. (p. 21).
"S.S.R. International Sales Catalogue Issue 4" by S.S.R. (International) Limited, Dyce, Aberdeen AB2 OGA, U.K.

Primary Examiner—Richard E. Chilcot, Jr.
Assistant Examiner—R. Biegel
Attorney, Agent, or Firm—Tracy W. Druce; Roland Cox

[57] ABSTRACT

A measuring device for measuring length of flexible line moved through the device along with tensile force in moving or stationary line. The device has a grooved counterwheel and pressure wheels pressing the line into a groove around the counterwheel and includes adjusters for adjusting the pressing force exerted by each pressure wheel on the line. A load cell mounted on the device is used to measure the resultant force on the counterwheel from tensile force in the line. A counter or counterdrive is connectible to the counterwheel shaft.

9 Claims, 3 Drawing Sheets

CABLE LENGTH AND TENSION MEASURING DEVICE

BACKGROUND OF THE INVENTION

1. Technical Field

This invention relates to measuring devices and relates in particular to a combination device useful to measure length of flexible line moved through the device and any tensile force in the line.

2. Background Information

A number of measuring devices are known for use with flexible line reels and wireline units for various well servicing operations in the petroleum industry. Many well servicing operations involve lowering well tools into a well flow conduit and retrieving them from the conduit on flexible line. The flexible line usually used is metal cable or solid metal "wireline", which is wound on and off a drum by a reeling device. A number of devices are available which measure length of line wound off a reeling device to indicate depth the tool has been lowered into the well conduit. Some of these measurement devices also indicate tensile force in the line from weight of line and well tools suspended in the conduit.

A "standard measuring device" is shown and described on page 2584 of the "Composite Catalog of Oil Field Equipment and Services", 37th revision, Volume 2, published by World Oil ®, Box 2608, Houston, TX 77001. This measuring device has long been used extensively throughout the petroleum industry for measuring length of line moved through the device only. Use of this device contributes to early fatigue failure from bending of steel "measuring line" as the line is bent from straight 360° or one complete wrap around the measuring wheel and back to straight as line moves through the device.

An example of a "measuring head", which also measures length of line moved through only, is shown on page 3.2 of "SIE Wireline Products", a publication of SIE, 7450 Winscott Rd., Ft. Worth, Texas 76126.

An example of a measuring device, which measures line tension and is supplied with a "live shaft" to which a counter may be connected, is shown on page 13 of Martin-Decker 1988-89 Catalog, published by Martin-Decker, 1200 Cypress Creek Rd., Cedar Park, Tex. 78613.

Shown on page 21 of a publication entitled "Mathey Wireline Units", by Mathey International, Ltd., P.O. Box 472110, Tulsa, OK 74147, are a number of "Depth Measuring Units" which measure length of line moved through the unit only. Also shown on page 21 are combination measuring units, which measure both length of line and "weight on" (tensile force in) the line.

"S.S.R. International Sales Catalogue Issue 4" also shows "counterheads" without load cells (for length measurement only) and a number of types of "counterheads" with load cells (for measurement of length and tensile force in the flexible line). This catalog was published by S.S.R. (International) Limited, Dyce, Aberdeen AB2 OGA, U.K.

SUMMARY OF THE INVENTION

The present invention provides a measurement device which measures length of flexible line moved through the device and any tensile force in the moving or stationary line. The device includes a counterwheel having a groove around mounted for rotation on a frame. Pressure wheels which press the line into the counterwheel groove are mounted for rotation less than 90° apart on the frame. The pressure wheels press the line into less than 150° of the counterwheel groove. Each pressure wheel shaft may be moved by an adjuster mounted in the frame to change the pressing force on the line. Also connected on the frame is a bracket having pairs of roller guides to guide the flexible line into and out from the counterwheel groove. Line moving through the measuring device in the counterwheel groove rotates the counterwheel shaft and counter to measure length of line moved through. A load cell for measuring tensile force in the line is connected on the frame along a line passing midway between the pressure wheels and through the center of the counterwheel shaft. A plate having an eye is connected to the load cell and is useful for properly positioning the combination measuring device.

The primary object of this invention is to provide a device for measuring length of flexible line moved through the device and any tensile force in moving or stationary line.

Also an object of this invention is to provide a measuring device which does not contribute to early failure of flexible line by repeatedly reverse bending the line as it is moved through the device.

Another object of this invention is to provide a measuring device having a measuring wheel which minimizes flexible line stresses by not requiring the flexible line to be bent even one wrap around the measuring wheel.

Another object of this invention is to provide a measuring device which is operable by friction of a flexible line contacting less than half the measuring wheel.

Also an object of this invention is to provide a measuring device which includes a load cell aligned with the resultant force produced by tensile force in the line for measuring tensile force in the line.

DESCRIPTION OF THE PREFERRED EMBODIMENT

Figure 1:
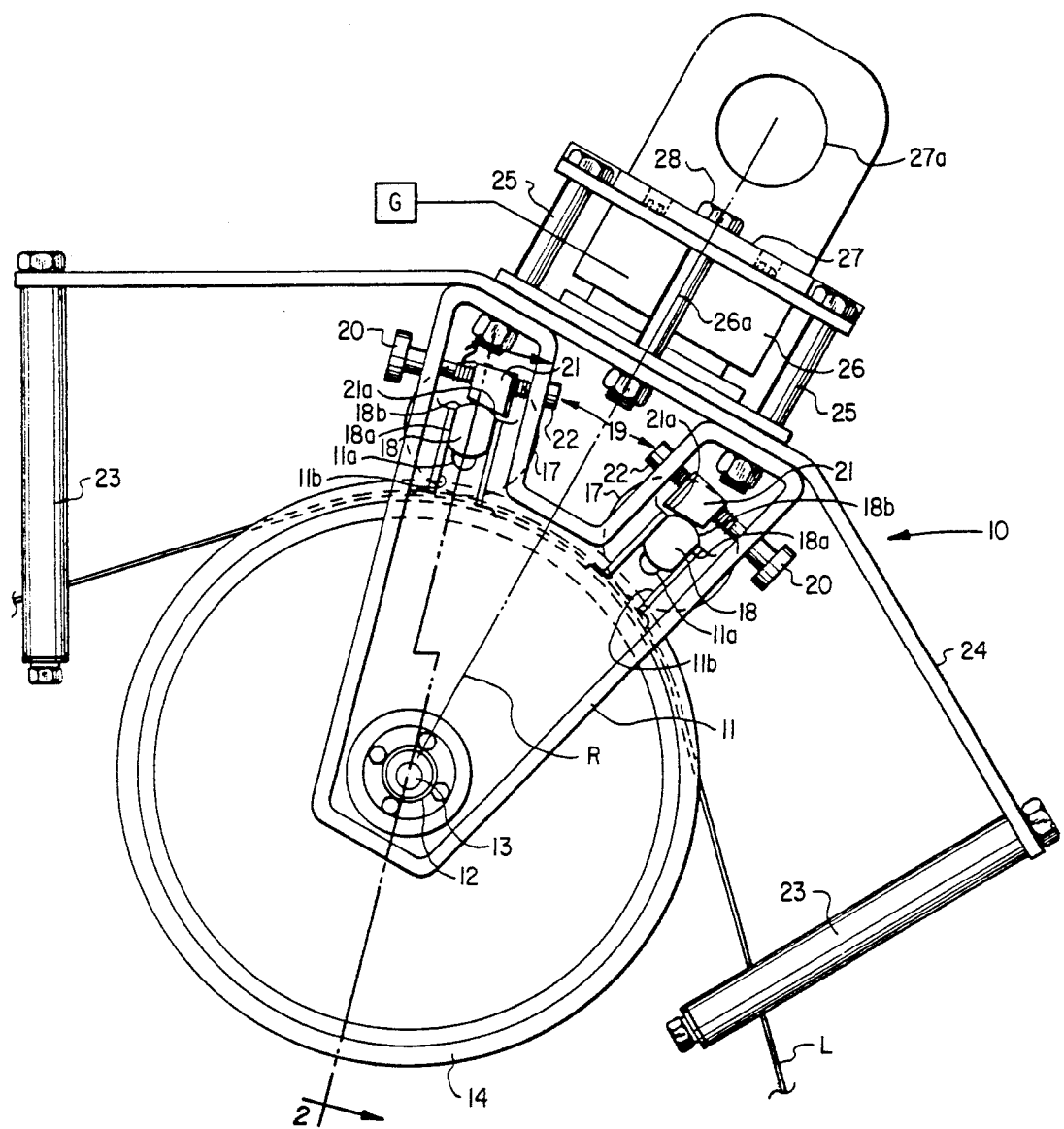
FIG. 1 is side elevational view of the combination measuring device.
Figure 2:
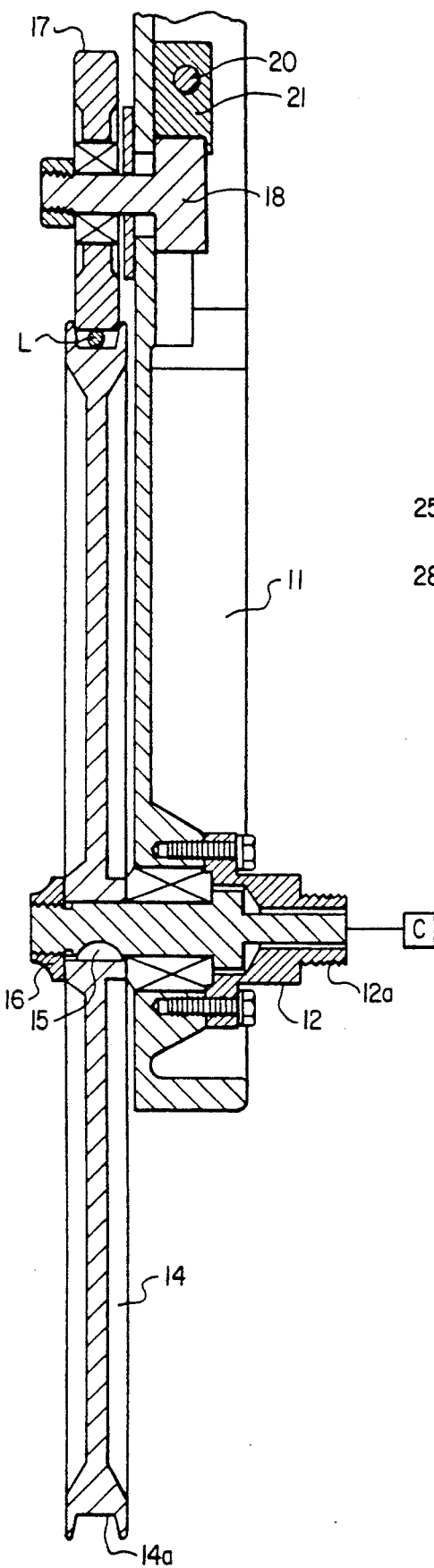
FIG. 2 is a sectional view of a mounted counterwheel.

FIG. 1 depicts the combination measuring device 10 of this invention having a frame 11 on which a bearing 12 is mounted. A shaft 13 is mounted in the bearing and the shaft is keyed to counterwheel 14 with key 15 and the counterwheel is connected to the shaft by nut 16. The bearing housing is adapted for connection of counter C (or a counterdrive) to the shaft at 12a—see also FIGS. 2 and 3.

Figure 4:
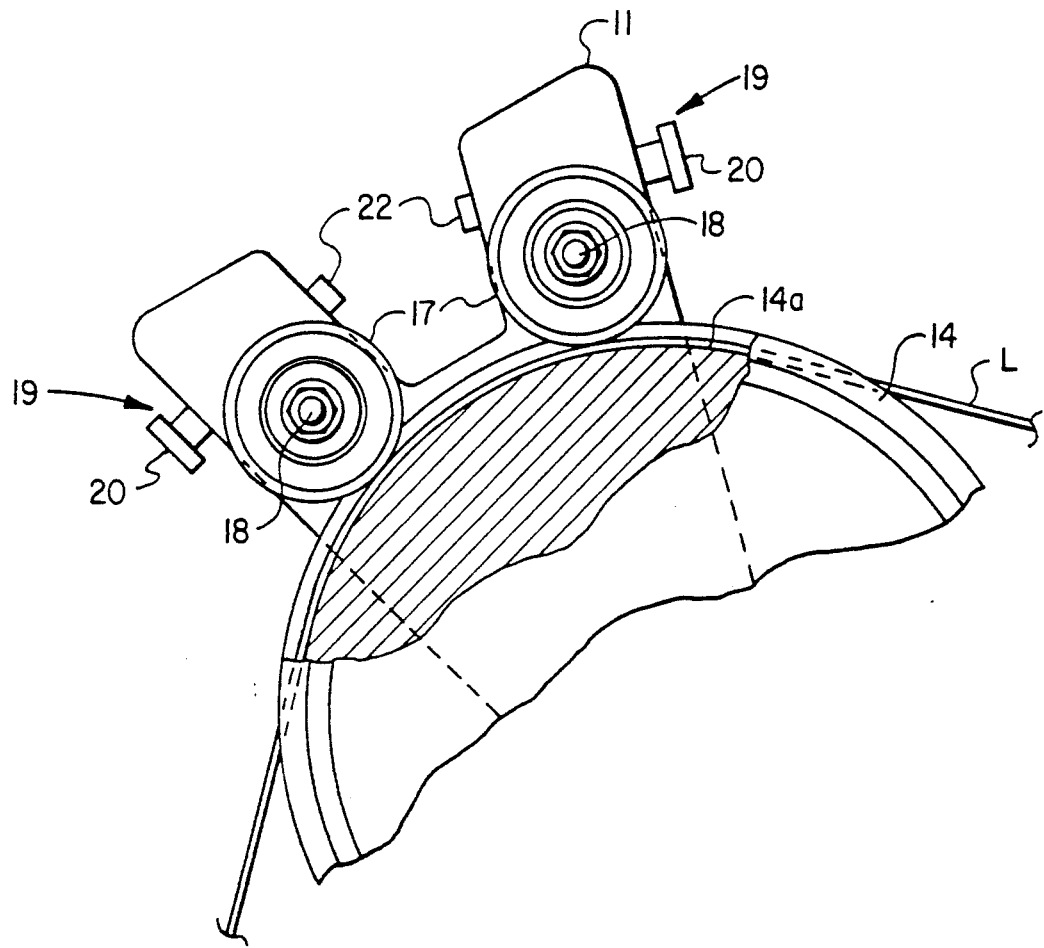
FIG. 4 is a partial cut-away view, as indicated in FIG. 3, showing the pressure wheels and counter wheel engagement.

Counterwheel 14 has a groove 14a into which flexible line L is pressed by pressure wheels 17—see also FIG. 4. Each pressure wheel is connected on a moveable shaft 18, which extends through a slot 11a in the frame. Each shaft has guide surfaces 18a which slidably engage guide surfaces 11b on the frame. These shafts may be moved inwardly or outwardly by adjusters 19 to change the force pressing the flexible line into the counterwheel groove. Each adjuster is mounted in the frame as shown in FIG. 1 and includes a bolt 20 which passes through a hole in the frame, is threadedly engaged with threads in block 21 and passes through an opposite hole in the frame. The bolts are connected in the frame with collars 22. Blocks 21 each have camming surfaces 21a which engage radial surfaces 18b on each shaft.

Figure 3:
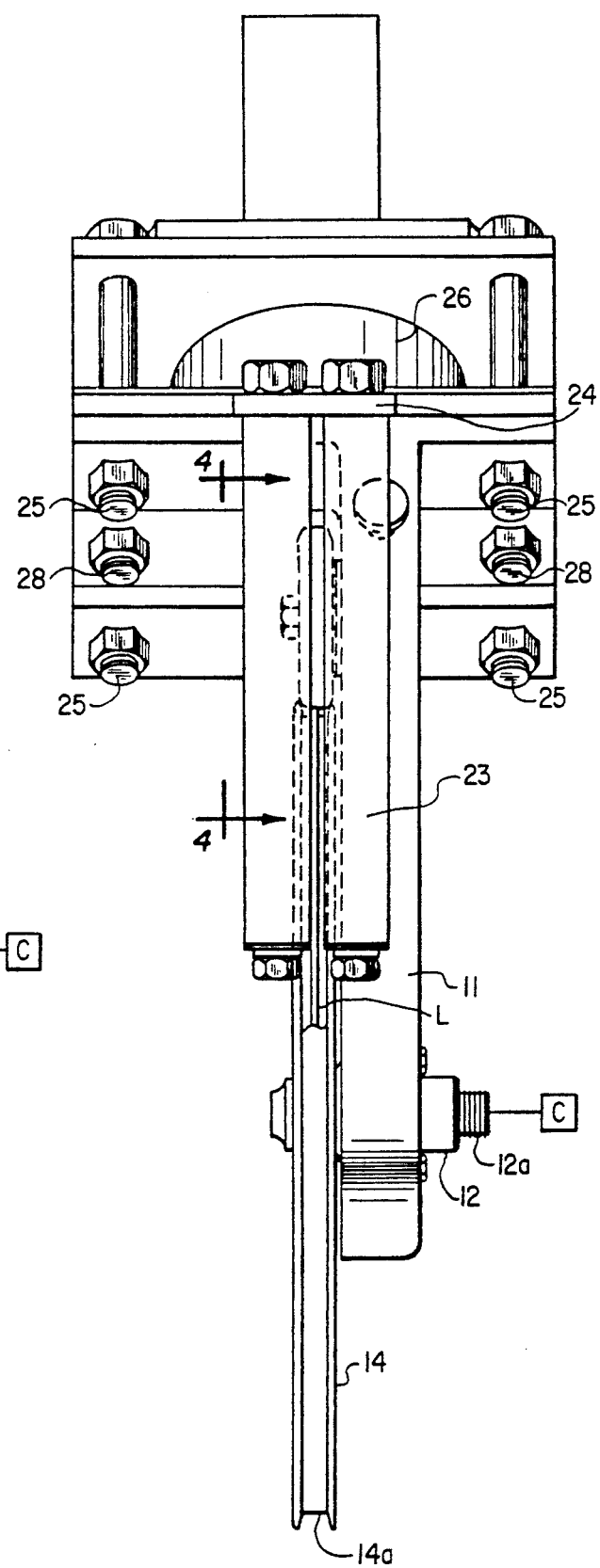
FIG. 3 is a front elevationl view of the combination measuring device with portions shown in shadow.

Line guides 23 are attached to bracket 24—see also FIG. 3. Bolts 25 connect a load cell 26 and the bracket to frame 11. The load cell has a central axis 26a and a gauge G is connected to the load cell to indicate compression or extension of the cell. A hydraulically operated compression type E series load cell available from Martin Decker Division, P.O. Box 1179, Cedar Park, Tex. 78613 is shown. Those skilled in measuring device art will understand an electronic load cell or "tension link" could be connected to frame 11 in place of the load cell for measuring tensile load placed on the frame by tensile force in the line. A plate 27 having an eye 27a is connected to the load cell with bolts 28 so that the axis of the load cell is parallel to or on line R in FIG. 1, which extends from the center of eye 27a midway between the pressure wheels and through the center of counterwheel shaft 13. Line R indicates the direction of the resultant tensile force placed on the counterwheel and frame by tensile force in the line.

The measuring device of this invention may be utilized to measure length of line moved through and any tensile force in the line by positioning the device and passing flexible line through the device as shown in FIG. 1 so that line L may be moved through in either direction. The measuring device 10 may be mounted on a shaft above a line reel to be moved from side to side as line is wound on or off the reel or the device may be anchored. Bolts 20 are turned to permit pressure wheels 17 to be moved outwardly out of counterwheel groove 14a. Line L is now passed through line guide 23, around the counterwheel in groove 14a and through the other line guide. Adjuster bolts 20 are turned to move the pressure wheels inwardly pressing the line to contact the inner surface of groove 14a. As line moves through measuring device 10 and rotates counterwheel 14, its shaft 13 and counter C, pressure wheels inward pressing force should be increased sufficiently to prevent the line from slipping in the counterwheel groove. Any tensile force in the line will act through the counterwheel and frame to compress (or extend) the load cell in proportion to and in the direction of the resultant of forces placed on the counterwheel and frame by line tensile force. The load cell gauge reading may be converted to actual tensile force in the line.

What I claim is:

1. A combination measuring device for measuring length of flexible line moved through the device and any tensile force in moving or stationary flexible line comprising:
   (a) a frame;
   (b) a counterwheel having a groove around for receiving flexible line;
   (c) means for mounting said counterwheel to rotate on said frame;
   (d) pressure wheels mounted on said frame for pressuring said flexible line into said counterwheel groove;
   (e) means for adjusting the pressing force each pressure wheel exerts on said flexible line, said adjusting means including:
   slots in said frame, each said slot having a guide surface,
   a shaft mounted for movement in each slot with a pressure wheel mounted for rotation on each shaft, said shaft having a guide surface slidably engageable with said slot guide surface;
   means for moving said shaft in said slot; and
   (f) a load cell mounted on said frame for measuring the force on said counterwheel resulting from tensile force in said flexible line.

2. The measuring device of claim 1 wherein the means for mounting the counterwheel to rotate on the frame comprises:
   (a) bearing mounted on the frame;
   (b) a shaft to which a counter may be connected mounted for rotation in said bearing; and
   (c) means for connecting the counterwheel to said shaft.

3. The measuring device of claim 2 wherein the means for connecting the counterwheel to the shaft includes:
   (a) a keyway in said shaft;
   (b) a keyway in said counterwheel;
   (c) a key in said keyways; and
   (d) a nut on said shaft.

4. The measuring device of claim 2 further including a counter connected to the shaft and a gauge connected to the load cell.

5. The measuring device of claim 1 further including a bracket mounted on the frame between the load cell and said frame, said bracket having guide means thereon for guiding the flexible line into and from the counterwheel groove.

6. The measuring device of claim 1 wherein the adjusting means further comprises:
   slots less than 90° apart in the frame, each slot having a guide surface;
   a shaft mounted for movement in each slot with a pressure wheel mounted for rotation on each shaft, said shaft having a guide surface slidably engageable with said slot guide surface;
   means for moving said shaft in said slot;
   said means for moving said shaft in said slot comprising:
   (a) a nut having a camming surface thereon; and
   (b) a bolt extending through the frame for threadedly engaging said positioning said nut so that said nut camming device surface engages said shaft.

7. A measuring device for measuring length of flexible line moved through the device and tensile force in the line comprising:
   (a) a frame having slots therethrough, each said slot having at least one guiding surface;
   (b) a counterwheel mounted to rotate on said frame, said counterwheel having a groove around for receiving flexible line;
   (c) means for mounting said counterwheel including a shaft;
   (d) a counter connected to said shaft;
   (e) pressure wheels for pressure flexible line into said counterwheel groove, each said pressure wheel mounted to rotate an a shaft extending through a frame slot, each shaft having at least one guiding surface slidably engageable with said slot guiding surface;
   (f) means pro moving each pressure wheel shaft to adjust the pressure force each said pressure wheel exerts on said flexible line, said moving means including:
a bolt extending through said frame;
a nut threadedly engaged on said bolt, said nut having a camming surface slidably engaging said pressure wheel shaft;

(g) a load cell for measuring force on said counterwheel resulting from tensile force in the flexible line, said load cell having an axis and a gauge connected thereto, said load cell mounted on said frame so that said load cell axis is along a line bisecting the angle between said pressure wheels and passing through the center of said counterwheel shaft.

8. The measuring device of claim 7 further including a bracket having guides mounted thereon for guiding flexible line into and out from the counterwheel groove.

9. The measuring device of claim 7 further including a plate having an eye, said plate connected on the load cell.

* * * * *